(12) United States Patent
Marshall et al.

(10) Patent No.: US 10,681,028 B2
(45) Date of Patent: Jun. 9, 2020

(54) CONTROLLING ACCESS TO RESOURCES ON A NETWORK

(71) Applicant: AirWatch LLC, Atlanta, GA (US)

(72) Inventors: John Marshall, Atlanta, GA (US); Erich Stuntebeck, Marietta, GA (US)

(73) Assignee: VMWare, Inc., Palo Alto, CA (US)

( * ) Notice: Subject to any disclaimer, the term of this patent is extended or adjusted under 35 U.S.C. 154(b) by 0 days.

(21) Appl. No.: 15/713,750

(22) Filed: Sep. 25, 2017

(65) Prior Publication Data

US 2018/0013747 A1 Jan. 11, 2018

Related U.S. Application Data

(63) Continuation of application No. 13/891,612, filed on May 10, 2013, now Pat. No. 9,787,655, which is a continuation-in-part of application No. 13/316,073, filed on Dec. 9, 2011, now Pat. No. 8,713,646.

(51) Int. Cl.
*H04L 29/06* (2006.01)
*G06F 21/33* (2013.01)

(52) U.S. Cl.
CPC ............ *H04L 63/08* (2013.01); *G06F 21/335* (2013.01); *H04L 63/10* (2013.01)

(58) Field of Classification Search
CPC ..... H04L 63/08; H04L 63/0876; H04L 63/10; G06F 21/335
See application file for complete search history.

(56) References Cited

U.S. PATENT DOCUMENTS

| | | | | |
|---|---|---|---|---|
| 7,958,347 | B1* | 6/2011 | Ferguson | H04L 9/321 713/155 |
| 8,776,190 | B1* | 7/2014 | Cavage | G06F 21/62 380/255 |
| 8,806,040 | B2* | 8/2014 | Shah | H04L 63/083 709/229 |
| 9,483,627 | B1* | 11/2016 | Ferg | G06F 21/31 |
| 2006/0031407 | A1* | 2/2006 | Dispensa | H04L 29/12009 709/219 |
| 2006/0168221 | A1* | 7/2006 | Juhls | H04L 63/08 709/225 |
| 2008/0134305 | A1* | 6/2008 | Hinton | H04L 63/08 726/5 |
| 2008/0137593 | A1* | 6/2008 | Laudermilch | H04W 48/02 370/328 |
| 2009/0260064 | A1* | 10/2009 | McDowell | G06F 21/10 726/4 |
| 2010/0235901 | A1* | 9/2010 | Simpkins | H04L 63/0281 726/12 |
| 2011/0271099 | A1* | 11/2011 | Preiss | H04L 63/0807 713/155 |
| 2012/0144202 | A1* | 6/2012 | Counterman | G06F 21/335 713/176 |

(Continued)

*Primary Examiner* — Khang Do
(74) *Attorney, Agent, or Firm* — Thomas|Horstemeyer, LLP

(57) ABSTRACT

Disclosed are various embodiments for controlling access to data on a network. Upon receiving a request comprising a device identifier and at least one user credential to access a remote resource, the request may be authenticated according to at least one compliance policy. If the request is authenticated, a resource credential associated with the remote resource may be provided.

17 Claims, 5 Drawing Sheets

(56) References Cited

U.S. PATENT DOCUMENTS

| | | | | |
|---|---|---|---|---|
| 2013/0061298 A1* | 3/2013 | Longobardi | ............ | G06F 21/42 |
| | | | | 726/6 |
| 2013/0104197 A1* | 4/2013 | Nandakumar | .......... | G06F 21/36 |
| | | | | 726/4 |
| 2014/0068743 A1* | 3/2014 | Marcus | .................. | G06F 21/33 |
| | | | | 726/8 |
| 2015/0281182 A1* | 10/2015 | Haghpassand | .......... | G06F 21/50 |
| | | | | 726/12 |

\* cited by examiner

CONTROLLING ACCESS TO RESOURCES ON A NETWORK

CROSS-REFERENCE TO RELATED APPLICATIONS

This application is a continuation of and claims the benefit of co-pending U.S. patent application Ser. No. 13/891,612, filed May 10, 2013, entitled "CONTROLLING ACCESS TO RESOURCES ON A NETWORK," as well as a continuation-in-part of U.S. patent application Ser. No. 13/316,073, filed Dec. 9, 2011, entitled "CONTROLLING ACCESS TO RESOURCES ON A NETWORK," both of which are incorporated herein by reference in their entireties.

BACKGROUND

Controlling access to enterprise resources by network-connected devices is critical to ensure that only authenticated and authorized users and devices gain access to sensitive information or services. To date, this has typically been accomplished by utilizing network firewalls, reverse proxy servers with authentication, and encrypted VPN tunnels. Today, however, enterprise resources are being moved out of enterprise-managed data centers and into the "Cloud." These Cloud-based network environments may not provide the configurability and customization necessary to sufficiently protect enterprise resources. For instance, protecting enterprise-managed data centers at a device level can be problematic. Cloud-based data services often do not provide the necessary features to allow enterprises to control access to the service at a device level, but rather permit access, without restriction as to any device, with proper user-level access controls.

BRIEF DESCRIPTION OF THE DRAWINGS

Many aspects of the present disclosure can be better understood with reference to the following diagrams. The components in the drawings are not necessarily to scale, emphasis instead being placed upon clearly illustrating certain features of the disclosure. Moreover, in the drawings, like reference numerals designate corresponding parts throughout the several views.

DETAILED DESCRIPTION

Disclosed are various embodiments for a system and associated devices and methods for controlling access to enterprise resources. The exemplary system comprising a proxy server and a compliance server, which authorize and authenticate devices for granting access to the enterprise resources based in part on device identifiers and access credentials. In one embodiment, an enterprise device serves up enterprise resources to users if the user provides the appropriate enterprise access credentials. However, certain devices from which users may access the enterprise resources may not qualify to access data in the enterprise device. Thus, even though the user may have user-level access, insufficient device-level access may prevent the user from accessing the enterprise resources. A proxy service authenticates the user and the wireless device from which the user requests the access based on one or more user access credentials and a unique device identifier associated with the wireless device. The proxy service may then communicate with a compliance service to authorize the wireless device by determining whether the wireless device complies with hardware, software, device management restrictions, and the like, defined in a set of compliance rules. Upon authenticating and authorizing both the user and the wireless device, the proxy server then associates the user's access request with enterprise access credentials and facilitates the access to the enterprise resource.

Figure 1:
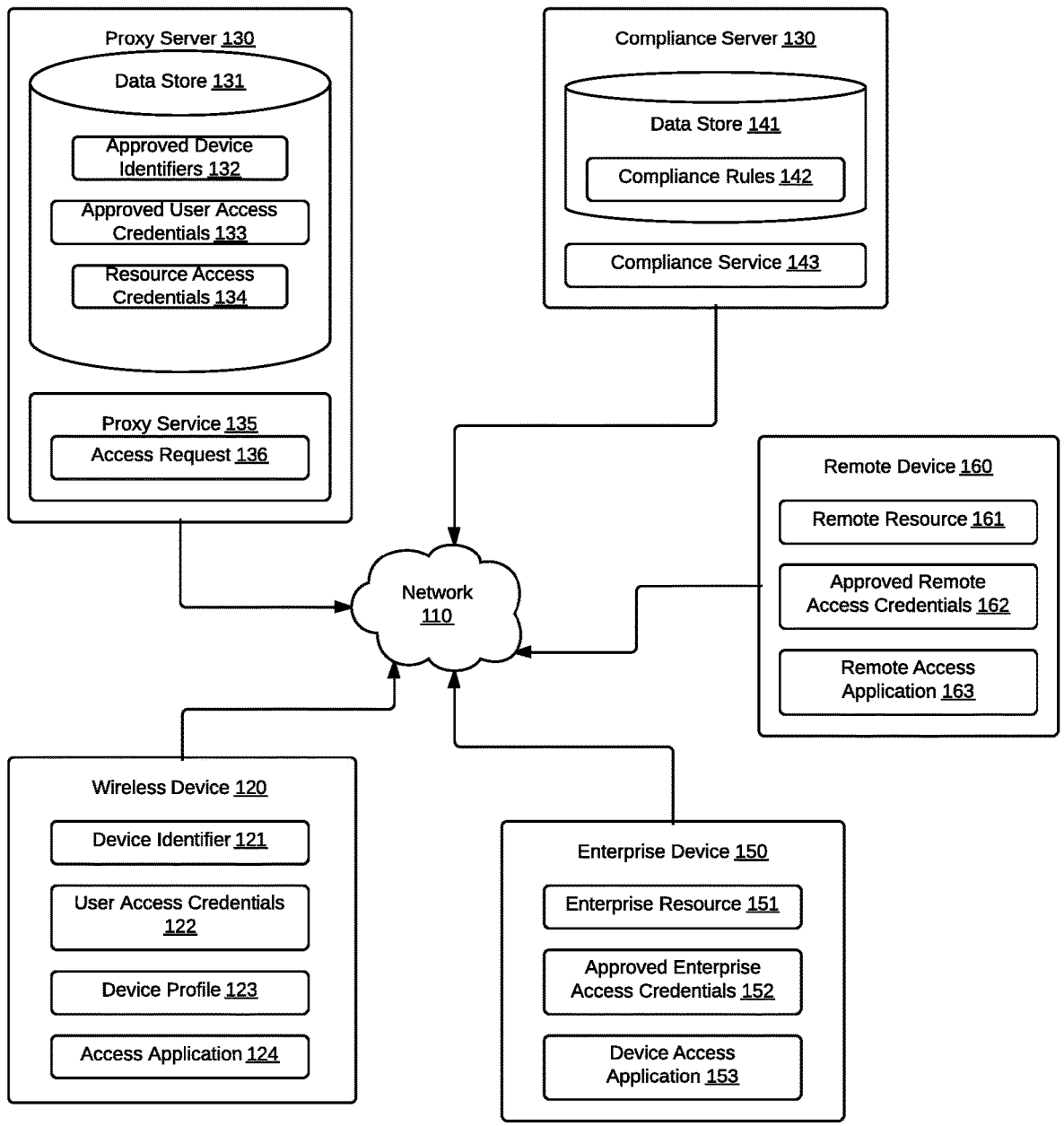
FIG. 1 is a block diagram of a networked environment according to embodiments of the present disclosure.

FIG. 1 illustrates a networked environment 100 according to various embodiments. The networked environment 100 includes a network 110, a wireless device 120, a proxy server 130, a compliance server 140, an enterprise device 150, and a remote device 160. The network 110 includes, for example any type of wireless network such as a wireless local area network (WLAN), a wireless wide area network (WWAN), or any other type of wireless network now known or later developed. Additionally, the network 110 includes the Internet, intranets, extranets, microwave networks, satellite communications, cellular systems, PCS, infrared communications, global area networks, or other suitable networks, etc., or any combination of two or more such networks. Embodiments of the present invention are described below in connection with WWANs (as illustrated in FIG. 1); however, it should be understood that embodiments of the present invention may be used to advantage in any type of wireless network.

In one embodiment, the network 110 facilitates the transport of data between one or more client devices, such as wireless device 120, the proxy server 130, the compliance server 140, the enterprise device 150, and the remote device 160. Other client devices may include a desktop computer, a laptop computer, a personal digital assistant, a cellular telephone, a set-top step, music players, web pads, tablet computer systems, game consoles, and/or other devices with like capability. Wireless device 120 comprises a wireless network connectivity component, for example, a PCI (Peripheral Component Interconnect) card, USB (Universal Serial Bus), PCMCIA (Personal Computer Memory Card International Association) card, SDIO (Secure Digital Input-Output) card, NewCard, Cardbus, a modem, a wireless radio transceiver, and/or the like. Additionally, the wireless device 120 may include a processor for executing applications and/or services, and a memory accessible by the processor to store data and other information. The wireless device 120 is operable to communicate wirelessly with the proxy server 130, the enterprise device 150, and the remote device 160 with the aid of the wireless network connectivity component.

Additionally, the wireless device 120 may store in memory a device identifier 121, user access credentials 122, a device profile 123, and potentially other data. In one embodiment, the device identifier 121 may include a software identifier, a hardware identifier, and/or a combination of software and hardware identifiers. For instance, the device identifier 121 may be a unique hardware identifier such as a MAC address, a CPU ID, and/or other hardware identifiers. The user access credentials 122 may include a username, a password, and/or biometric data related to facial recognition, retina recognition, fingerprint recognition, and the like. Additionally, the device profile 123 may include a listing of hardware and software attributes that describe the wireless device 120. For instance, the device profile 123 may include hardware specifications of the wireless device 120, version information of various software installed on the wireless device 120, and/or any other hardware/software attributes. Additionally, the device profile 123 may also include data indicating a date of last virus scan, a date of last access by IT, a date of last tune-up by IT, and/or any other data indicating a date of last device check.

The wireless device 120 may further be configured to execute various applications such as an, and an access application 124. The access application 124 may be executed to transmit a request for access to the enterprise resources 151 available on the enterprise device 150 and/or a request for remote resources 161 on remote device 160. The wireless device 120 may be configured to execute client side applications such as, for example, a browser, email applications, instant message applications, and/or other applications. For instance, the browser may be executed in the wireless device 120, for example, to access and render network pages, such as web pages, or other network content served up by proxy server 130, the compliance server 140, the enterprise device 150, and/or any other computing system.

In one embodiment, the enterprise device 150 represents an enterprise level computing device that stores and serves up enterprise resources 151, and/or performs other enterprise level functions. For instance, the enterprise device 150 may store in memory enterprise resources 151, a listing of approved enterprise access credentials 152, and potentially other data. The enterprise resources 151 may be stored in the device, a database accessible by the device, and/or other storage facility in data communication with the enterprise device 150. In one embodiment, the enterprise resources 151 may include any type of enterprise data, such as, for instance, enterprise documents, files, file systems, and/or any other type of data. In another embodiment, the enterprise resource 151 may include enterprise level applications and services that may be accessed and executed on an accessing device. For instance, a user operating the accessing device (e.g., wireless device 120) may invoke the enterprise level application that is then executed on the accessing device. The listing of approved enterprise access credentials 152 may be a list of pre-approved enterprise access credentials that provide access to the enterprise resources 151.

The enterprise device 150 may further be configured to execute various applications such as a device access application 153. The device access application 153 may be executed to receive a request for access to the enterprise resources 151 and determine whether to grant the requested access. For instance, the device access application 153 may receive the request for access from the wireless device 120, the proxy server 130, the compliance server 140, and/or any other computing system. In response, the device access application 153 may then determine whether the enterprise access credentials associated with the requesting device match one or more of the credentials included in the listing of approved enterprise access credentials 152. Based on this determination, the device access application 153 may grant the request device with access to the enterprise resources 151. The enterprise device 150 may be configured to execute other enterprise side applications and/or services such as, a mail service, an internet service, a messaging service, and/or other services.

In some embodiments, the remote device 160 may comprise a third-party computing device that stores and serves up remote resources 161, and/or performs other third party functions. For instance, the remote device 160 may store in memory remote resources 161, a listing of approved remote access credentials 162, and potentially other data. The remote resources 161 may be stored in the device, a database accessible by the device, and/or other storage facility in data communication with the remote device 160. In some embodiments, the remote resources 161 may include any type of third party data, such as, for instance, databases, applications, documents, files, file systems, and/or any other type of data that may be accessed and/or executed on an accessing device. For instance, a user operating the accessing device (e.g., wireless device 120) may invoke an application that is then executed on the accessing device. The listing of approved remote access credentials 162 may be a list of pre-approved remote access credentials that provide access to the remote resources 161.

The remote device 160 may further be configured to execute various applications such as a remote access application 163. The remote access application 163 may be executed to receive a request for access to the remote resources 161 and determine whether to grant the requested access. For instance, the remote access application 163 may receive the request for access from the wireless device 120, the proxy server 130, the compliance server 140, and/or any other computing system. In response, the remote access application 163 may then determine whether the remote access credentials associated with the requesting device match one or more of the credentials included in the listing of approved remote access credentials 162. Based on this determination, the remote access application 163 may grant the requesting device with access to the remote resources 161. The remote device 160 may be configured to execute other applications and/or services such as, a mail service, an internet service, a messaging service, and/or other services. The remote device 160 may be further operative to log access and/or changes by the wireless device 120.

The proxy server 130 and the compliance server 140 can be implemented as, for example, a server computer or any other system capable of providing computing capability. Further, the proxy server 130 may be configured with logic for performing the methods described herein. Although one proxy server 130 and one compliance server 140 is depicted, certain embodiments of the networked environment 100 include more than one proxy server 130 and compliance server 140. One or more of the servers may be employed and arranged, for example, in one or more server banks or computer banks or other arrangements. For example, the server computers together may include a cloud computing resource, a grid computing resource, and/or any other distributed computing arrangement. Such server computers may be located in a single installation or may be distributed among many different geographical locations. For purposes of convenience, the proxy server 130 and the compliance server 140 are referred to herein in the singular.

Various applications and/or other functionality may be executed in the proxy server 130 and the compliance server 140, respectively, according to certain embodiments. Also, various data is stored in a data store 131 that is accessible to the proxy server 130 and/or a data store 141 accessible to the compliance server 140. The data stored in each of the data stores 131 and 141, for example, may be accessed, modified, removed, and/or otherwise manipulated in association with the operation of the applications and/or functional entities described herein.

The components executed in the proxy server 130 include a proxy service 135, and may include other applications, services, processes, systems, engines, or functionality not discussed in detail herein. As used herein, the term "proxy service" is meant to generally refer to computer-executable instructions for performing the functionality described herein for authenticating user access credentials and device identifiers. The proxy service 135 is executed to receive an access request 136 from a wireless device 120 for accessing enterprise resources 151 and to determine whether to grant or deny the access request 136. Upon determining to grant the access request 136, the proxy service 135 may then associate the wireless device 120 with necessary enterprise access credentials to access the enterprise resource 151, as will be described.

The data stored in data store 131 may include, for example, approved device identifiers 132, approved user access credentials 133, approved resource access credentials 134, and potentially other data. The approved device identifiers 132 represents a listing of device identifiers 121 that have been pre-approved for accessing the enterprise resources 151 in the enterprise device 150. For instance, the approved device identifiers 132 may have been previously provided to the proxy server 130. The approved user access credentials 133 represents a listing of user access credentials 122 that have been pre-approved for accessing the enterprise resources 151 of the enterprise device 150. Additionally, the resource access credentials 134 may provide access to the enterprise resources 151 when associated with the access request 136.

The components executed in the compliance server 140 include a compliance service 143, and may include other applications, services, processes, systems, engines, or functionality not discussed in detail herein. As used herein, the term "compliance service" is meant to generally refer to computer-executable instructions for performing the functionality described herein for authorizing the device characteristics of the requesting device. The compliance service 143 is executed to determine whether the device characteristics of the wireless device 120 comply with the compliance rules 142 that are stored in the data store 141. For instance, the compliance service 143 may identify the device characteristics from the device profile 123 of each wireless device 120. Additionally, the compliance rules 142 represents a listing of hardware restrictions, software restrictions, and/or mobile device management restrictions that need to be satisfied by the wireless device 120.

In one embodiment, hardware restrictions included in the compliance rules 142 may comprise restrictions regarding use of specific wireless devices 120 and specific wireless device features, such as, for instance, cameras, Bluetooth, IRDA, tethering, external storage, a mobile access point, and/or other hardware restrictions. Software restrictions included in the compliance rules 142 may comprise restrictions regarding the use of specific wireless device operating systems or applications, internet browser restrictions, screen capture functionality, and/or other software restrictions. Mobile device management restrictions included in the compliance rules 142 comprise encryption requirements, firmware versions, remote lock and wipe functionalities, logging and reporting features, GPS tracking, and/or other mobile device management features.

The compliance service 143 may determine whether the device characteristics of a requesting device (e.g. wireless device 120) satisfy one or more of the restrictions enumerated in the compliance rules 142. For example, the compliance service 143 may determine that a requesting device that has a camera, Bluetooth capability, and is executing a specified version of an operating system is compliant with the compliance rules 142. As another example, the compliance service 143 may determine that a requesting device that is associated with an external storage unit and has screen capture functionality enabled is not compliant with the compliance rules 142.

A user operating a wireless device 120 may wish to access data or another resource on the enterprise device 150, such as enterprise resources 151. In one embodiment, the user may manipulate a network page rendered on a display associated with the wireless device 120 to transmit the access request 136 to request access to the enterprise resources 151. In another embodiment, the user may manipulate a user interface generated by a local executed application. The user may provide login information, such as, for instance, a unique user name, a password, biometric data, and/or other types of user access credentials 122 and request to access the enterprise resources 151 stored on the enterprise device 150. The access application 124 may transmit the access request 136 to access the enterprise resources 151 to the proxy service 135. In another embodiment, the access application 124 may transmit the request 136 to access the enterprise resources 151 directly to the enterprise device 150. In this embodiment, the device access application 153 receive the request and re-route the request to the proxy server 130.

Upon receiving the request 136, the proxy service 135 determines whether to grant or deny the access request 136. In one embodiment, the proxy service 135 may first authenticate the wireless device 120 and the user operating the wireless device 120. To this end, the proxy service 135 determines whether the device identifier 121 associated with the wireless device 120 matches one of the identifiers listed in the listing of approved identifiers 132. For instance, the device identifier 121 of the wireless device 120 may be included as part of the request 136 transmitted by the access application 124. In another embodiment, the proxy service 135 may request to receive the device identifier 121 in response to receiving the access request 136. Upon identifying and/or receiving the device identifier 121, the proxy service 135 determines whether the device identifier 121 matches one of the approved identifiers 132 stored in the data store 131. In another embodiment, the proxy service 135 may authenticate the wireless device 120 dynamically by determining whether the device identifier 121 is within a predetermined range of approved device identifiers 132. In yet another embodiment, the proxy service 135 may authenticate the wireless device 120 dynamically by performing an algorithm on the device identifier 121.

Additionally, the proxy service 135 may also authenticate the user operating the wireless device 120 by determining whether the user access credentials 122 associated with the user matches one of the credentials in the listing of approved user access credentials 133. For instance, the user access credentials 122 associated with the user on the wireless device 120 may be included as part of the request 136 transmitted by the access application 124. In another embodiment, the proxy service 135 may request to receive the user access credentials 122 in response to receiving the access request 136. Upon identifying and/or requesting the user access credentials 122, the proxy service 135 may identify the user access credentials 122 from the request 136 and determine whether the user access credentials 122 matches one of the approved user access credentials 133 stored in the data store 131.

Having authenticated the wireless device 120 and the user operating the wireless device 120, the proxy service 135 communicates with the compliance service 143 to authorize the wireless device 120 for accessing the enterprise resources 151. In one embodiment, the compliance service 143 authorizes the wireless device 120 by determining whether the device characteristics of the wireless device 120 comply with the compliance rules 142. For instance, the compliance service 143 identifies the device characteristics of the wireless device 120 from the device profile 123. The compliance service 143 then analyzes the device characteristics to determine whether the software restrictions, hardware restrictions, and/or device management restrictions defined in the compliance rules 142 are satisfied and returns the result of the determination to the proxy service 135. In an alternative embodiment, the proxy service 135 may determine whether the wireless device 120 complies with the compliance rules 143.

If the proxy service 135 determines or receives a determination that the wireless device 120 is authorized, the proxy service 135 then associates the wireless device 120 with one or more resource access credentials 134. In one embodiment, the proxy service 135 modifies the access request 136 transmitted by the access application 124 by replacing the user access credentials 122 with one or more resource access credentials 134. In another embodiment, the proxy service 135 may modify the access request 136 by also replacing the device identifier 121. The proxy service 135 then relays the access request 136 with the approved resource access credentials 134 to the enterprise device 150 for processing.

In one embodiment, the device access application 153 in the enterprise device 150 receives the modified access request 136 from the proxy service 135 and serves up the requested enterprise resources 151 to the proxy service 135. For instance, the device access application 153 determines whether the resource access credentials 134 inserted into the access request 136 matches one or more of the approved enterprise access credentials 152. Upon determining that the resource access credentials 134 match one of the approved enterprise access credentials 152, the device access application 153 serves up the requested quantity of enterprise resources 151. In response, the proxy service 135 relays the requested enterprise resources 151 to the wireless device 120. In another embodiment, the device access application 153 may serve up the requested enterprise resources 151 directly to the wireless device 120.

Figure 2:
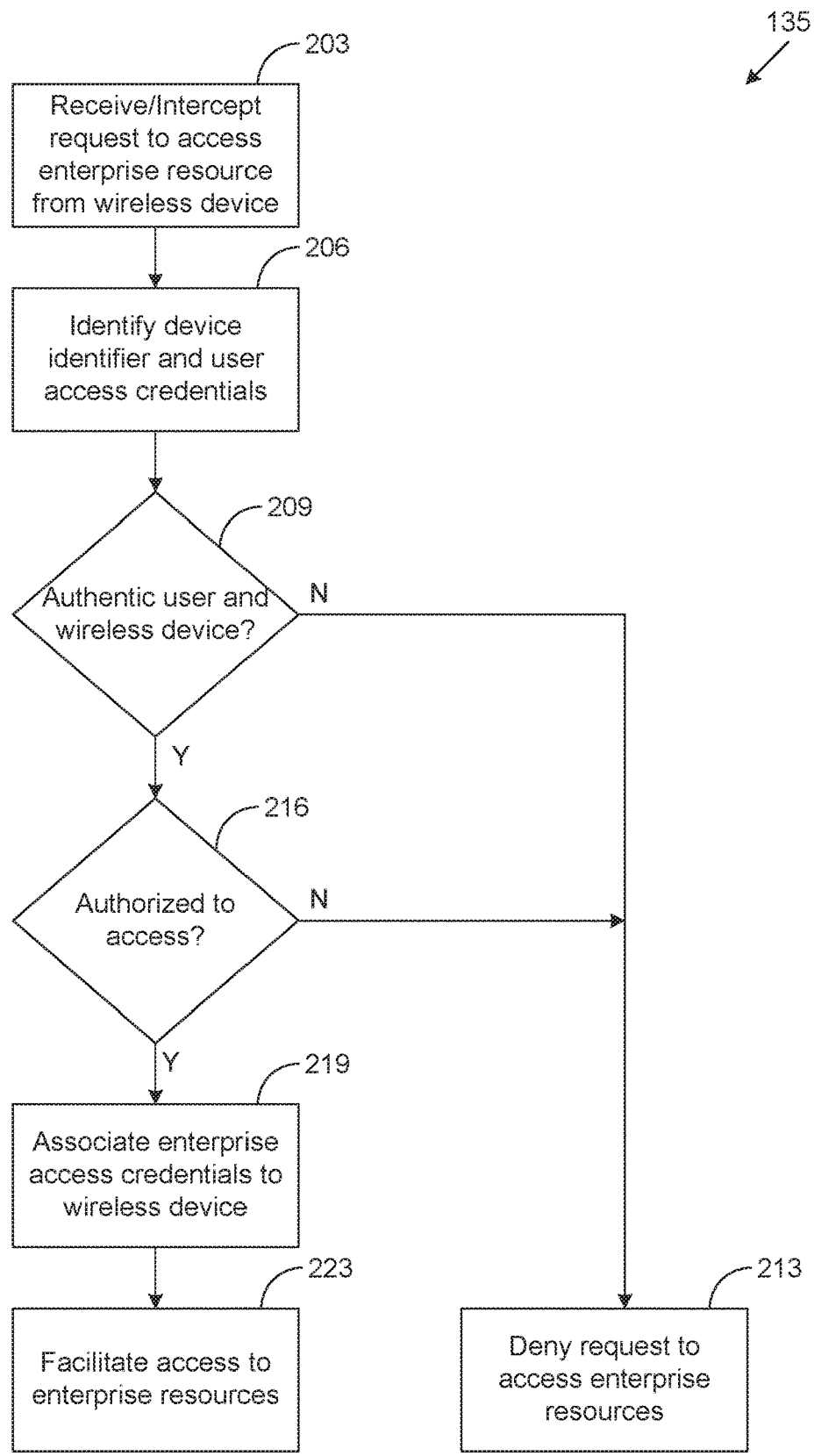
FIG. 2 is a flowchart illustrating functionality implemented as portions of a proxy service executed by a proxy server in the networked environment of FIG. 1 according to embodiments of the present disclosure.

FIG. 2 is a flowchart illustrating an exemplary method performed by a portion of the proxy service 135 according to various embodiments. It is to be understood that the flowchart of FIG. 2 provides merely an example of the many different types of functional arrangements that may be employed to implement the proxy service 135 as described herein.

Beginning with step 203, the proxy service 135 receives an access request 136 (FIG. 1) from the access application 124 (FIG. 1) executed by a wireless device 120 (FIG. 1) to access enterprise resources 151 (FIG. 1) served up by the enterprise device 150 (FIG. 1). Then, in step 206, the proxy service 135 identifies a device identifier 121 (FIG. 1) associated with the wireless device 120 and the user access credentials 122 (FIG. 1) of the user operating the wireless device 120. In one embodiment, the device identifier 121 and the user access credentials 122 may be received by the proxy service 135 in conjunction with the request 136. In another embodiment, the proxy service 135 may separately request the device identifier 121 and the user access credentials 122 from the wireless device 120.

Next, in step 209, the proxy service 135 determines whether the wireless device 120 and the user operating the wireless device 120 are authentic. In one embodiment, the proxy service 135 determines whether device identifier 121 associated with the wireless device 120 matches one of the identifiers included in the listing of approved device identifiers 132 (FIG. 1). Additionally, the proxy service 135 determines whether the user access credentials 122 associated with the user matches one of the credentials included in the approved user access credentials 133 (FIG. 1). If the proxy service 135 is unable to match either one of the device identifier 121 and the user access credentials 122 with the approved device identifiers 132 and the approved user access credentials 133, respectively, then the proxy service 135 proceeds to step 213 and denies the access request 136 to access the enterprise resources 151.

However, if the proxy service 135 matches both the device identifier 121 and the user access credentials 122 with the approved device identifiers 132 and the approved user access credentials 133, respectively, then the proxy service 135 proceeds to step 216. In step 216, the proxy service 135 determines whether the wireless device 120 is authorized to access the requested enterprise resources 151. As mentioned, the proxy service 135 may communicate with the compliance service 143 to determine whether the wireless device 120 is authorized to access the enterprise resources 151 on the enterprise device 150, as described above. If the proxy service 135 determines that the wireless device 120 is not authorized, then the proxy service proceeds to step 213 and denies the request 136 to access the enterprise resources 151.

However, if the proxy service 135 determines that the wireless device 120 is authorized to access the enterprise resources 151, then the proxy service proceeds to step 219. In step 219, the proxy service 135 associates one set of resource access credentials 134 (FIG. 1) with the access request 136. For instance, the proxy service 135 may modify the original access request 136 transmitted by the access application 124 to remove the user access credentials 122 and insert the resource access credentials 134.

Then, in step 223, the proxy service 135 facilitates accessing the enterprise resources 121 for the wireless device 120. In one embodiment, the proxy service 135 relays the modified access request 136 to the device access application 153 of the enterprise device 150. In response, the proxy service 135 may receive the requested enterprise resources 151 from the device access application 153 if the resource access credentials 134 match one of the approved enterprise access credentials 152. Upon receiving the requested enterprise resources 151, the proxy service 135 may communicate to the requested enterprise resources 151 to the access application 124. In another embodiment, the device access application 153 may communicate the requested enterprise resources 151 directly to the access application 124.

Figure 3:
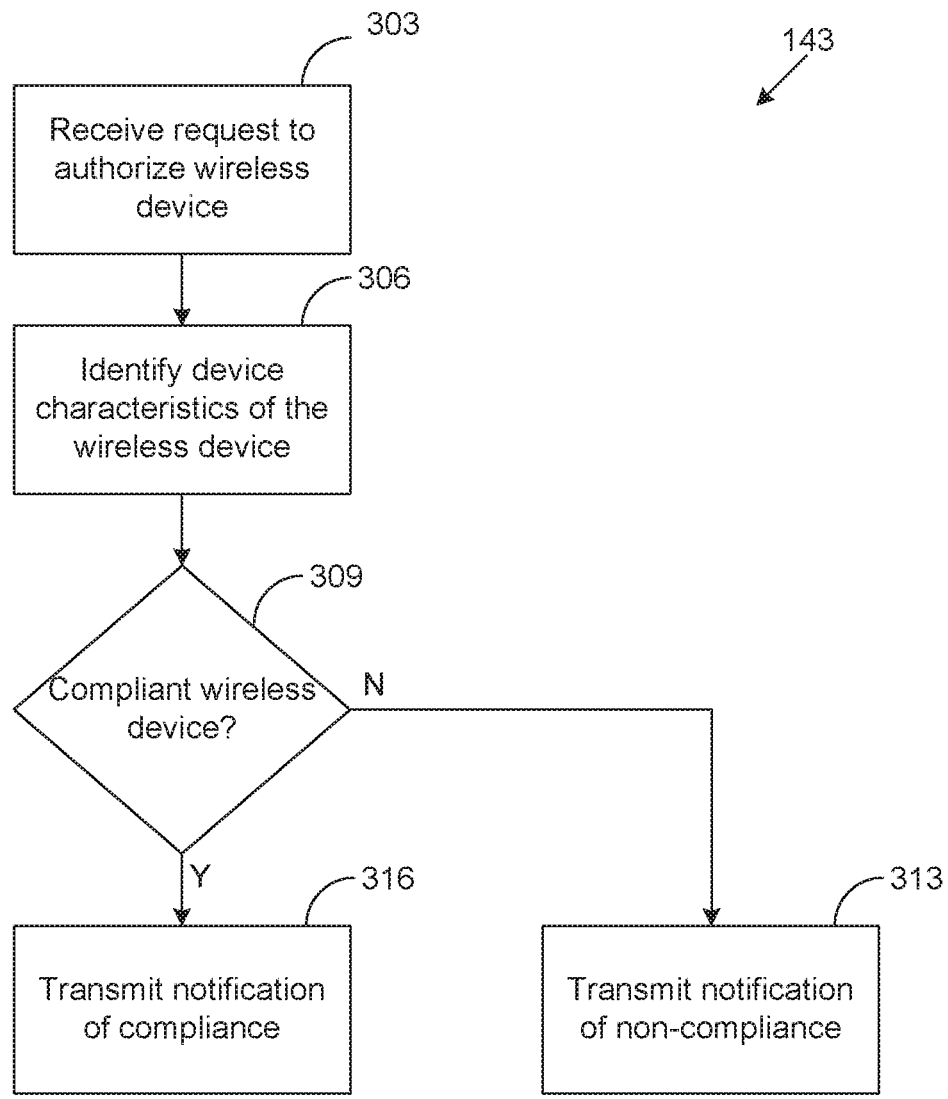
FIG. 3 is a flowchart illustrating functionality implemented as portions of a compliance service executed by a compliance server in the networked environment of FIG. 1 according to embodiments of the present disclosure.

FIG. 3 is a flowchart illustrating an example of a method performed by compliance service 143 according to certain embodiments. It is to be understood that the flowchart of FIG. 3 provides merely an example of the many different types of functional arrangements that may be employed to implement the compliance service 143 as described herein.

Beginning with step 303, the compliance service 143 receives a request from the proxy service 135 (FIG. 1) to authorize a wireless device 120 (FIG. 1) for accessing enterprise resources 151 (FIG. 1) served up by the enterprise device 150 (FIG. 1). Then, in step 306, the compliance service 143 identifies the device characteristics of the wireless device 120 (FIG. 1). For instance, the compliance service 143 may determine the device characteristics from the device profile 123 (FIG. 1) of the wireless device 120. In one embodiment, the compliance service 143 may receive the device profile 123 from the proxy service 135 in conjunction with the access request 136. In another embodiment, the compliance service 143 may transmit a request to the wireless device 120 to receive the device profile 123. In yet another embodiment, the device profile 123 of each wireless device 120 in the networked environment 100 (FIG. 1) may be stored in the data store 141 (FIG. 1) of the compliance server 140. In this embodiment, the compliance service 143 may access the local copy of the device profile 123. Further, the local copy of the device profile 123 may be periodically updated from the respective wireless device 120.

Next, in step 309, the compliance service 143 determines whether the wireless device 120 is complaint with the compliance rules 143 (FIG. 1) and is therefore authorized to access the enterprise resources 151. In one embodiment, the compliance service 143 determines that the wireless device 120 is compliant if the device characteristics of the wireless device 120 satisfy the compliance rules 142 required to access the enterprise device 150. For instance, the compliance rules 142 may comprise hardware restrictions, software restrictions, and device management restrictions. If the compliance service 143 determines that the wireless device 120 is not compliant, then in step 313 the compliance service 143 transmits a notification that the wireless device 120 failed the compliance check. However, if the compliance service 143 determines that the wireless device is compliant, then in step 316 the compliance service 143 transmits a notification to the proxy service 135 that the wireless device 120 passed the compliance check.

Figure 4:
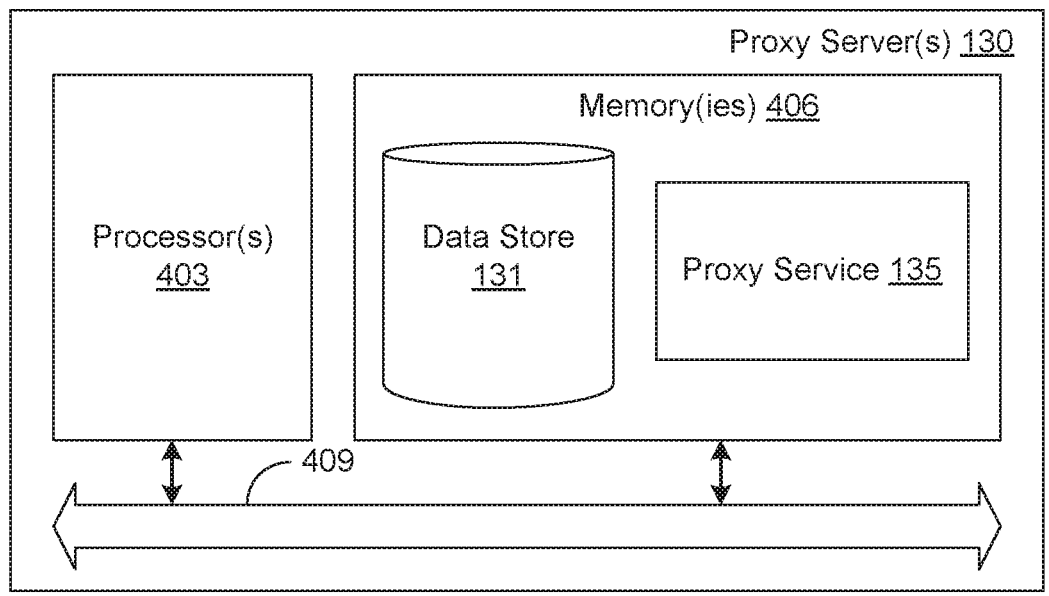
FIG. 4 is a schematic block diagram illustrating a proxy server and compliance server employed in the networked environment of FIG. 1 according to embodiments of the present disclosure.
Figure 4:
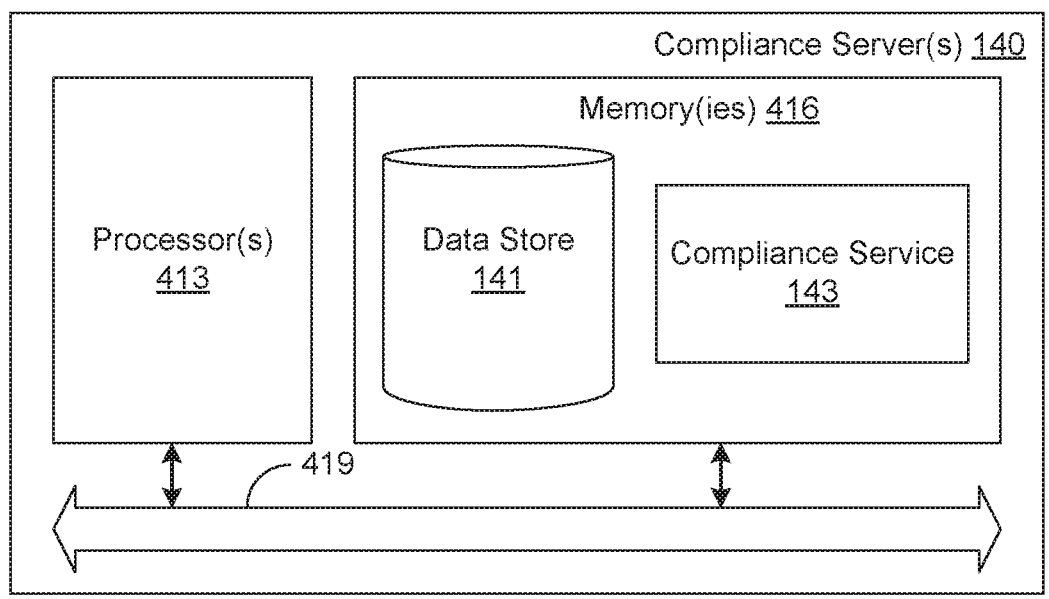

With reference to FIG. 4, shown is a schematic block diagram of the proxy server 130 and the compliance server 140 according to an embodiment of the present disclosure. The proxy server 130 includes at least one processor circuit, for example, having a processor 403 and a memory 406, both of which are coupled to a local interface 409. Additionally, the compliance server 140 includes at least one processor circuit, for example, having a processor 413 and a memory 416, both of which are coupled to a local interface 419 To this end, the proxy server 130 and the compliance server 140 may comprise, for example, at least one server computer or like device. The local interfaces 409 and 419 may comprise, for example, a data bus with an accompanying address/control bus or other bus structure as can be appreciated.

Stored in the memories 406 and 416 are both data and several components that are executable by the processors 403 and 413. In particular, stored in the memory 406/416 and executable by the processors 403 and 413 are a proxy service 135, a compliance service 143, and potentially other applications. Also stored in the memories 406 and 416 may be a data stores 131 and 141 and other data. In addition, an operating system may be stored in the memories 406 and 416 and executable by the processors 403 and 413.

It is to be understood that there may be other applications that are stored in the memories 406 and 416 and are executable by the processors 403 and 413 as can be appreciated. Where any component discussed herein is implemented in the form of software, any one of a number of programming languages may be employed such as, for example, C, C++, C #, Objective C, Java, Javascript, Perl, PHP, Visual Basic, Python, Ruby, Delphi, Flash, or other programming languages.

A number of software components are stored in the memories 406 and 416 and are executable by the processors 403 and 413. In this respect, the term "executable" means a program file that is in a form that can ultimately be run by the processors 403 and 413. Examples of executable programs may be, for example, a compiled program that can be translated into machine code in a format that can be loaded into a random access portion of the memories 406 and 416 and run by the processors 403 and 413, source code that may be expressed in proper format such as object code that is capable of being loaded into a random access portion of the memory 406/416 and executed by the processors 403 and 413, or source code that may be interpreted by another executable program to generate instructions in a random access portion of the memories 406 and 416 to be executed by the processors 403 and 413, etc. An executable program may be stored in any portion or component of the memories 406 and 416 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 406 and 416 are defined herein as including both volatile and nonvolatile memory and data storage components. Volatile components are those that do not retain data values upon loss of power. Nonvolatile components are those that retain data upon a loss of power. Thus, the memories 406 and 416 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 403 and 413 may represent multiple processors, and the memories 406 and 416 may represent multiple memories that operate in parallel processing circuits, respectively. In such a case, the local interfaces 409 and 419 may be an appropriate network 109 (FIG. 1) that facilitates communication between any two of the multiple processors 403 and 413, or between any two of the memories 406 and 416, etc. The local interfaces 409 and 419 may comprise additional systems designed to coordinate this communication, including, for example, performing load balancing. The processors 403 and 413 may be of electrical or of some other available construction.

Figure 5:
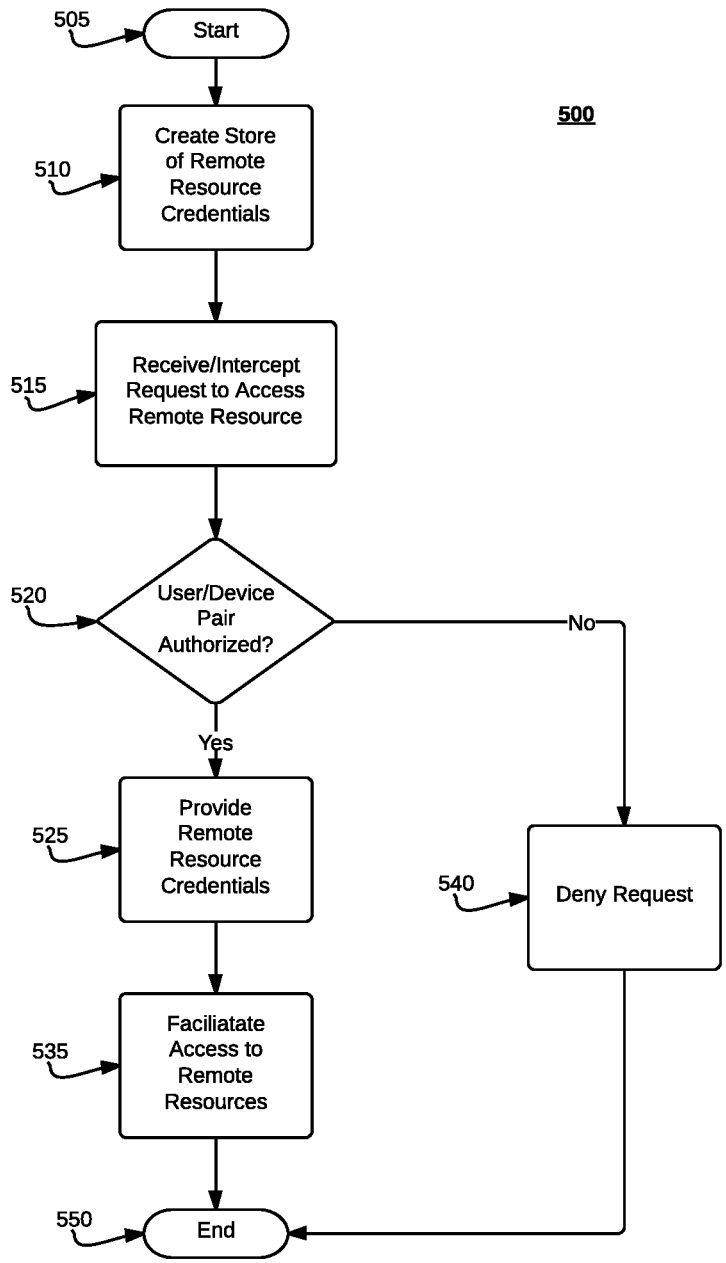
FIG. 5 is a flowchart illustrating a method for providing remote resource access credentials.

FIG. 5 is a flowchart setting forth the general stages involved in a method 500 consistent with embodiments of this disclosure for providing remote resource access credentials. Method 300 may be implemented using elements of networked environment 100 as described above. Ways to implement the stages of method 500 will be described in greater detail below. Method 500 may begin at starting block 505 and proceed to stage 510 where proxy server 130 may create a store of remote resource credentials. For example, proxy server 130 may create a list of available remote resources in data store 131. Such remote resources may comprise cloud-based storage solutions, web applications, third-party databases, etc. Non-limiting examples of such remote resources may comprise the Microsoft® Office365 service, the Google® document service, Dropbox®, recruiting services, travel agent services, financial and credit card management services, and expense tracking services. Enterprise-level credentials may be created for each of the available remote resources according to the requirements of the specific resource. For example, a credit card management service may provide user access credentials to allow accounting group members of the enterprise to share a login and password that provides access to account management functions for various corporate credit cards associated with the enterprise. For another example, some and/or all employees of an enterprise may use a shared authorization credential to access a third party provided expense reporting service or document editing/annotation service.

Method 500 may then advance to stage 515 where proxy server 130 receives an access request 136 from the access application 124 executed by a wireless device 120 to access remote resources 161. For example, a user of wireless device 120 may execute access application 124 comprising a document editing application. The document editing application may request to access a document stored on remote device 160 for annotation.

Method 500 may then advance to stage 520 where proxy server 130 may determine whether the request to access the remote resource is authorized. For example, proxy service 135 identifies a device identifier 121 associated with the wireless device 120 and the user access credentials 122 of the user operating the wireless device 120. In some embodiments, the device identifier 121 and the user access credentials 122 may be received by the proxy service 135 in conjunction with the request 136. In other embodiments, the proxy service 135 may separately request the device identifier 121 and the user access credentials 122 from the wireless device 120.

The proxy service 135 may determine whether the wireless device 120 and the user operating the wireless device 120 are authentic. In some embodiments, the proxy service 135 determines whether device identifier 121 associated with the wireless device 120 matches one of the identifiers included in the listing of approved device identifiers 132. Additionally, the proxy service 135 determines whether the user access credentials 122 associated with the user matches one of the credentials included in the approved user access credentials 133. If the proxy service 135 is unable to match either one of the device identifier 121 and the user access credentials 122 with the approved device identifiers 132 and the approved user access credentials 133, respectively, then the proxy service 135 proceeds to stage 540 and denies the access request 136 to access the remote resource(s) 161.

The proxy service 135 may also determine whether the wireless device 120 is authorized to access the requested remote resource(s) 161. As mentioned, the proxy service 135 may communicate with the compliance service 143 to determine whether the wireless device 120 is authorized to access the enterprise resource(s) 161 on the remote device 160, as described above. If the proxy service 135 determines that the wireless device 120 is not authorized, then the proxy service proceeds to stage 540 and denies the access request 136 to access the remote resource(s) 161.

However, if the proxy service 135 matches both the device identifier 121 and the user access credentials 122 with the approved device identifiers 132 and the approved user access credentials 133, respectively, then method 500 may advance to stage 525 where proxy server 130 may associate resource access credentials 134 with the access request 136. For instance, the proxy service 135 may modify the original access request 136 transmitted by the access application 124 to remove the user access credentials 122 and insert the resource access credentials 134.

Method 500 may then advance to stage 535 where proxy service 135 may facilitate accessing the remote resources 161 for the wireless device 120. In some embodiments, the proxy service 135 relays the modified access request 136 to the remote access application 163 of the remote device 160. In response, the proxy service 135 may receive the requested remote resources 161 from the remote access application 163 if the resource access credentials 134 match one of the approved remote access credentials 162. Upon receiving the requested remote resources 161, the proxy service 135 may communicate the requested remote resources 161 to the access application 124. In another embodiment, the remote access application 163 may communicate the requested remote resources 161 directly to the access application 124.

Although the proxy service 135, the compliance service 143, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2, 3, and 5 show the functionality and operation of an implementation of portions of the proxy service 135 and the compliance service 143, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 403 and 413 in a computer system or other system. The machine code may be converted from the source code, etc. If embodied in hardware, each block may represent a circuit or a number of interconnected circuits to implement the specified logical function(s).

Although the flowcharts of FIGS. 2, 3, and 5 show a specific order of execution, it is understood that the order of execution may differ from that which is depicted. For example, the order of execution of two or more blocks may be scrambled relative to the order shown. Also, two or more blocks shown in succession in FIGS. 2, 3, and 5 may be executed concurrently or with partial concurrence. Further, in some embodiments, one or more of the blocks shown in FIGS. 2, 3, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the proxy service 135 and the compliance service 143, that comprises software or code can be embodied in any non-transitory computer-readable medium for use by or in connection with an instruction execution system such as, for example, a processors 403 and 413 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for authenticating a client device and providing access to a remote resource hosted by a remote device, comprising:
   receiving, in a proxy server, a re-routed request, the re-routed request originating from a request by a client device to the remote device and being re-routed to the proxy server;
   requesting, using the proxy server, user credentials of a user from the client device in response to receiving the re-routed request;
   obtaining, in the proxy server, the requested user credentials from the client device;
   determining, using the proxy server, that the client device is authorized to access the remote resource based at least in part upon the user credentials obtained from the client device;
   generating, in the proxy server, an access credential associated with the remote resource; and
   transmitting, from the proxy server, the access credential to the client device, wherein the access credential permits the client device to access the remote resource from the remote device.

2. The method of claim 1, wherein the user credentials are obtained from a prompt to authenticate the user generated by the client device.

3. The method of claim 1, wherein determining that the client device is authorized to access the remote resource further comprises:
   extracting, in the proxy server, a device identifier from the re-routed request received from the client device; and
   determining, in the proxy server, that the device identifier corresponds to one of a plurality of approved device identifiers accessible to the proxy server.

4. The method of claim 3, wherein determining that the client device is authorized to access the remote resource further comprises:
   transmitting, from the proxy server, a request to authorize the client device or the user associated with the client device to another server; and
   obtaining, in the proxy server, an indication from the other server that the client device or the user associated with the client device are authorized.

5. The method of claim 1, wherein determining that the client device is authorized to access the remote resource further comprises:
   extracting, in the proxy server, a device identifier from the re-routed request received from the client device; and
   determining, in the proxy server, that the device identifier corresponds to a client device that is in compliance with at least one compliance rule.

6. The method of claim 5, wherein determining that the device identifier corresponds to a client device that is in compliance with at least one compliance rule further comprises:
   transmitting, from the proxy server, a request to obtain a compliance status of the client device to another server; and
   obtaining, in the proxy server, an indication from the other server that the client device is in compliance with the at least one compliance rule.

7. A system for authenticating a client device and providing access to a remote resource hosted by a remote device, comprising:
   a proxy server; and
   an application executed by the proxy server, the application, when executed, causing the proxy server to at least:
   receive a re-routed request, the re-routed request originating from a request by a client device to the remote device and being re-routed to the proxy server;
   request user credentials of a user from the client device in response to receiving the re-routed request;
   obtain the requested user credentials from the client device;
   determine that the client device is authorized to access the remote resource based at least in part upon the user credentials obtained from the client device;
   generate an access credential associated with the remote resource; and
   transmit the access credential to the client device, wherein the access credential permits the client device to access the remote resource from the remote device.

8. The system of claim 7, wherein the user credentials are obtained from a prompt to authenticate the user generated by the client device.

9. The system of claim 7, wherein the application determines that the client device is authorized to access the remote resource by causing the proxy server to at least:
 extract a device identifier from the re-routed request received from the client device; and
 determine that the device identifier corresponds to one of a plurality of approved device identifiers accessible to the proxy server.

10. The system of claim 9, wherein the application determines that the client device is authorized to access the remote resource by causing the proxy server to at least:
 transmit a request to authorize the client device or the user associated with the client device to another server; and
 obtain an indication from the other server that the client device or the user associated with the client device are authorized.

11. The system of claim 7, wherein the application determines that the client device is authorized to access the remote resource by causing the proxy server to at least:
 extract a device identifier from the re-routed request received from the client device; and
 determine that the device identifier corresponds to a client device that is in compliance with at least one compliance rule.

12. The system of claim 11, wherein the application determines that the device identifier corresponds to a client device that is in compliance with at least one compliance rule by causing the proxy server to at least:
 transmit a request to obtain a compliance status of the client device to another server; and
 obtain an indication from the other server that the client device is in compliance with the at least one compliance rule.

13. A non-transitory computer readable medium embodying a program executable by a proxy server for authenticating a client device and providing access to a remote resource hosted by a remote device, the program, when executed, causing the proxy server to at least:
 receive a re-routed request, the re-routed request originating from a request by a client device to the remote device and being re-routed to the proxy server;
 request user credentials of a user from the client device in response to receiving the re-routed request;
 obtain the requested user credentials from the client device;
 determine that the client device is authorized to access the remote resource based at least in part upon the user credentials obtained from the client device;
 generate an access credential associated with the remote resource; and
 transmit the access credential to the client device, wherein the access credential permits the client device to access the remote resource from the remote device.

14. The non-transitory computer readable medium of claim 13, wherein the user credentials are obtained from a prompt to authenticate the user generated by the client device.

15. The non-transitory computer readable medium of claim 13, wherein the program determines that the client device is authorized to access the remote resource by causing the proxy server to at least:
 extract a device identifier from the re-routed request received from the client device; and
 determine that the device identifier corresponds to one of a plurality of approved device identifiers accessible to the proxy server.

16. The non-transitory computer readable medium of claim 15, wherein the program, when executed, determines that the client device is authorized to access the remote resource by causing the proxy server to at least:
 transmit a request to authorize the client device or the user associated with the client device to another server; and
 obtain an indication from the other server that the client device or the user associated with the client device are authorized.

17. The non-transitory computer readable medium of claim 13, wherein the program, when executed, determines that the client device is authorized to access the remote resource by causing the proxy server to at least:
 extract a device identifier from the re-routed request received from the client device; and
 determine that the device identifier corresponds to a client device that is in compliance with at least one compliance rule.

* * * * *